United States Patent
Williams

[15] 3,655,149
[45] Apr. 11, 1972

[54] FLAP ACTUATING MECHANISM
[72] Inventor: William W. Williams, Atlanta, Ga.
[73] Assignee: Lockheed Aircraft Corporation, Burbank, Calif.
[22] Filed: Sept. 25, 1970
[21] Appl. No.: 75,609

[52] U.S. Cl. ....................................................244/42 DA
[51] Int. Cl. .....................................................B64c 9/18
[58] Field of Search..................244/42 R, 42 DA, 42 CB, 43, 244/40, 45, 46

[56] References Cited

UNITED STATES PATENTS

| | | | |
|---|---|---|---|
| 2,213,791 | 9/1940 | Zap | 244/42 CB |
| 2,222,935 | 11/1940 | Chilton | 244/43 |
| 2,609,166 | 9/1952 | Bellam | 244/43 |
| 3,438,598 | 4/1969 | Tammel | 244/42 DA |

FOREIGN PATENTS OR APPLICATIONS 732,917   3/1943   Germany..........................244/42 DA Primary Examiner—Milton Buchler
Assistant Examiner—Carl A. Rutledge
Attorney—John J. Sullivan and George C. Sullivan

[57] ABSTRACT

An extensible and retractable wing flap actuating mechanism particularly designed and adapted for modern heavy cargo aircraft employs gear-driven sliding rails to support and extend the flap and separate gearbox and linkage arrangements buried inside the flap to control the angle thereof. Thus, conventional tracks, rollers, screwjacks and similar relatively complex, heavy and unreliable mechanisms are avoided. Spherical, self-aligning bearings are employed as attachments between the flap and rail/wing structures which allow the conjugate motions of the flap and the structural deflections to occur without binding or jamming the mechanism.

6 Claims, 9 Drawing Figures

Patented April 11, 1972

INVENTOR.
WILLIAM W. WILLIAMS

Patented April 11, 1972
3,655,149
4 Sheets-Sheet 3
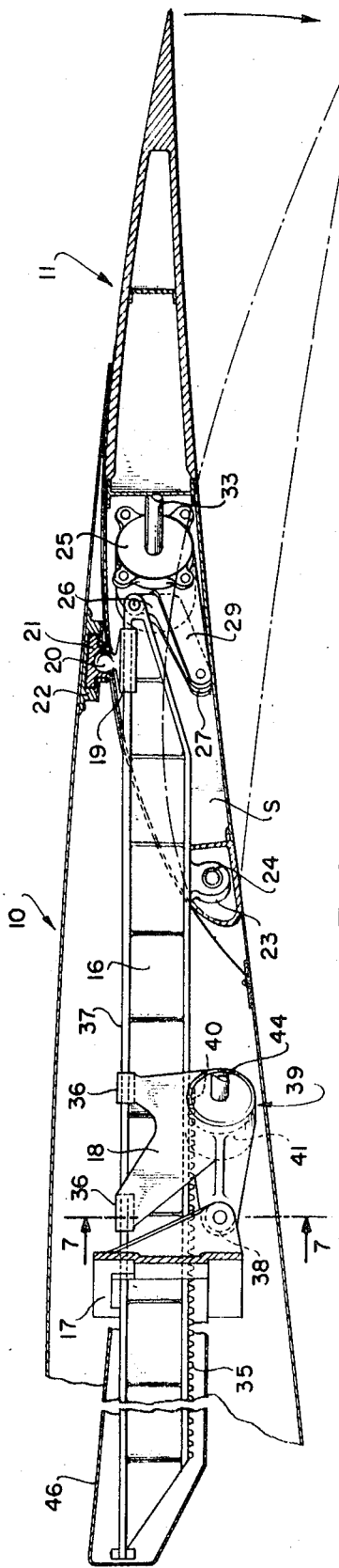
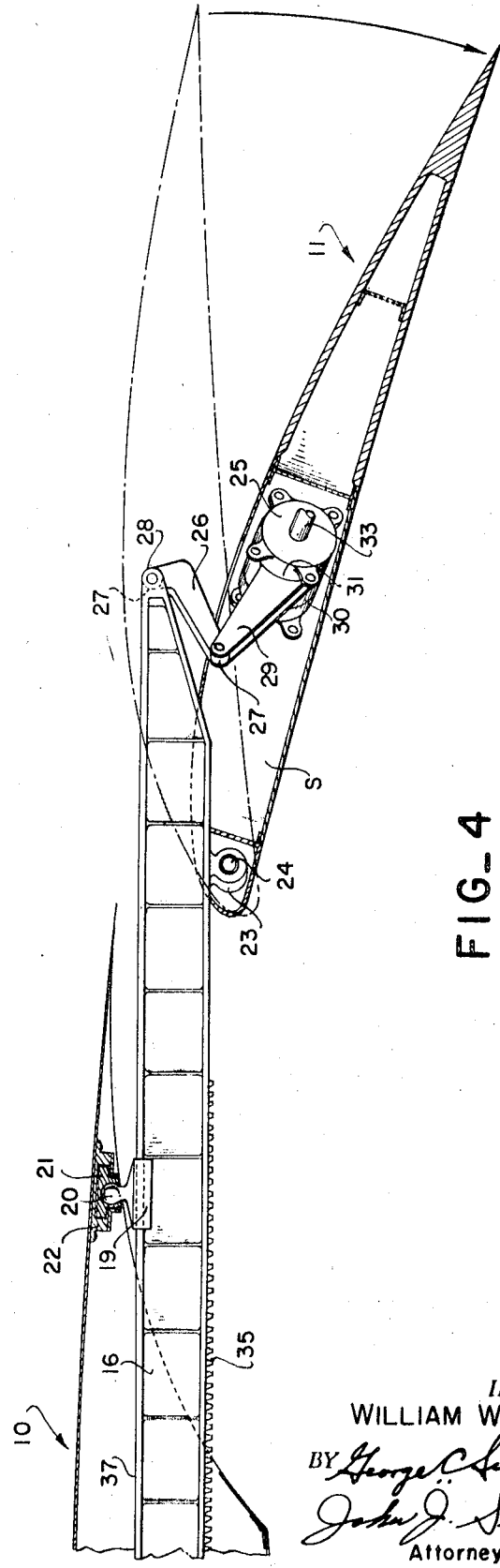
FIG.-3
FIG.-4
INVENTOR.
WILLIAM W. WILLIAMS
BY George C. Sullivan, agent
John J. Sullivan
Attorney

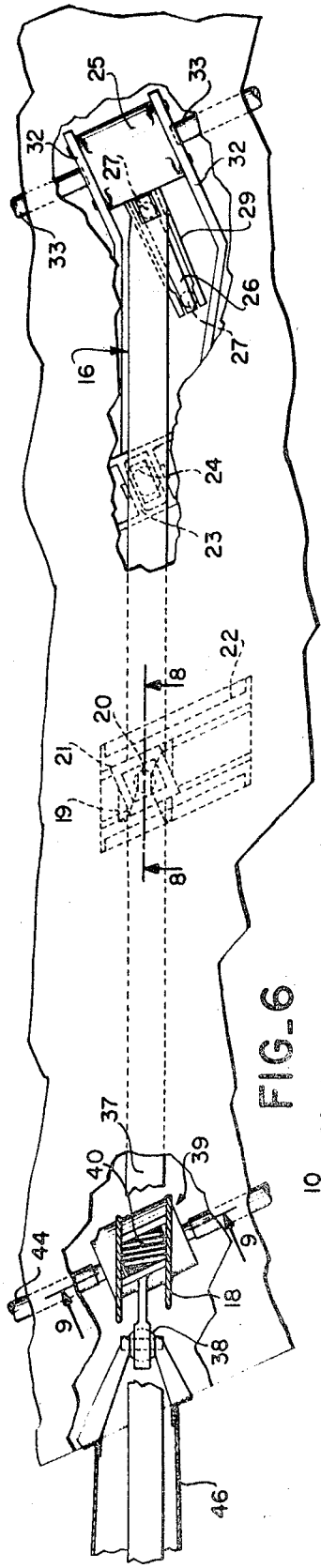
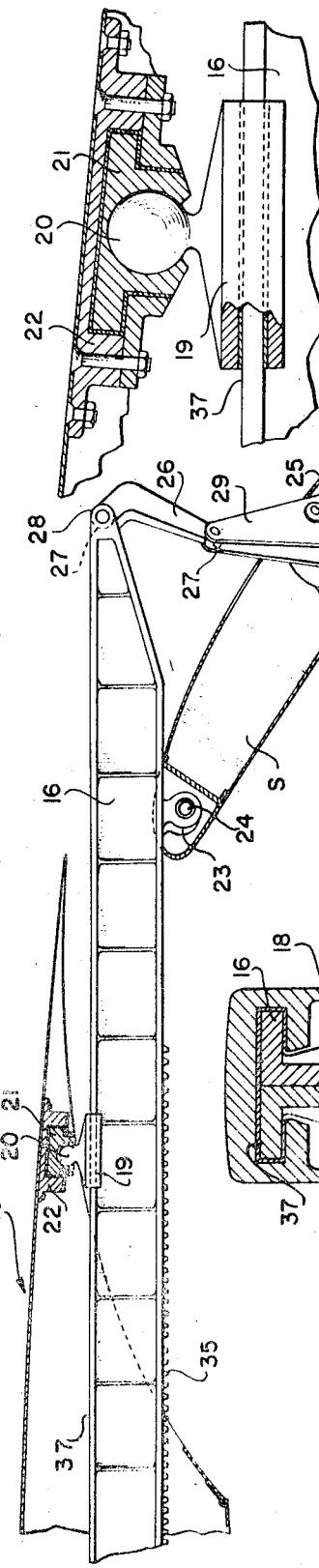
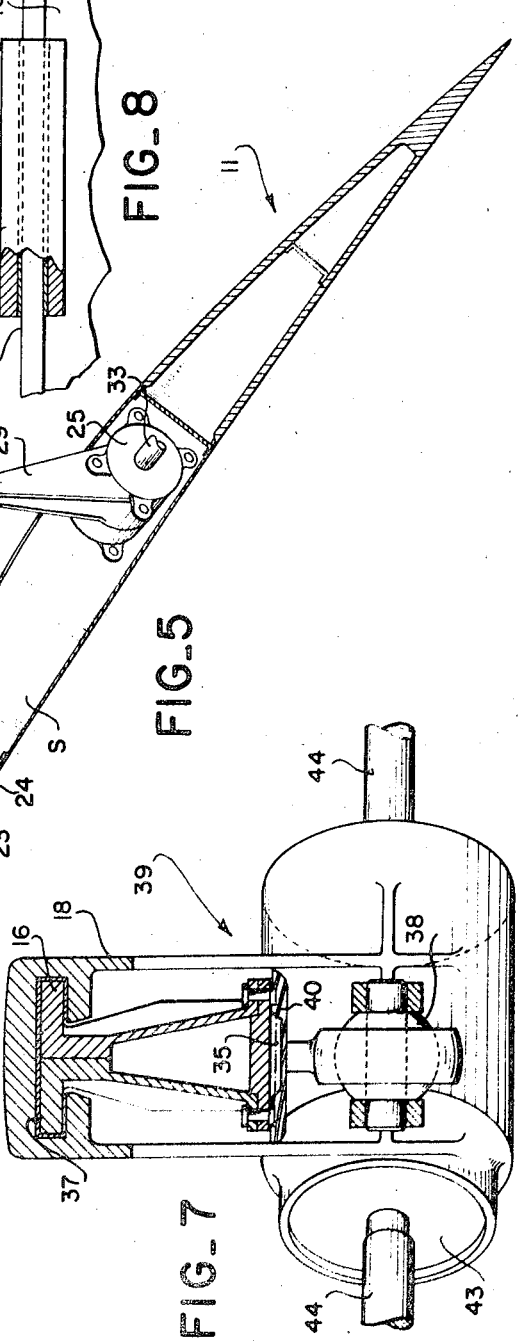
INVENTOR.
WILLIAM W. WILLIAMS
BY George C. Sullivan, agent
John J. Sullivan
Attorney

FLAP ACTUATING MECHANISM

This invention relates to actuating mechanisms for aircraft control surfaces and more particularly to an extensible and retractable flap actuating mechanism especially designed and constructed for larger and heavier aircraft to maximize the speed and lift capabilities thereof.

The extensible and retractable flap such as the well-known Fowler flap has been successfully employed for many years to convert wings which are aerodynamically designed for high speed in flight to high lift for take-off and to high drag for landing. This is desirable in order to minimize runway length.

As aircraft grow larger and heavier, the actuating mechanisms employed to accomplish such flap extension and retraction become more complex and less reliable. Also, the increase in loads imposed on such surfaces or flaps requires heavier supporting structures within the aircraft in order to mount the actuating mechanisms and complete retraction of the mechanism and its appurtenances becomes increasingly more difficult. Anything less than complete retraction is objectionable because of drag. Even where fairings and the like can be employed to render the wing aerodynamically clean for cruise and general flight operation, these add undesirable weight and complexity to the ultimate aircraft. Conventional tracks, rollers, carriages, screwjacks, and the like are, therefore, no longer satisfactory with present-day, heavy aircraft.

Additional complications exist where tapered extensible flaps on swept back wings are employed, a common aerodynamic configuration today. Thus, there arises an increased tendency of binding due to deflections and complex secondary motions. General conditions with respect to structural integrity, resistance to vibration, damage and deflections of the mechanisms are also aggravated by tapered flaps on swept back wings.

The present invention addresses itself to the foregoing problems. At the same time, it proposes to overcome shortcomings inherent in known prior art designs and concepts of flap actuators by a structural combination which permits the inclusion of the flap extension and retraction drive totally within the main wing contour and the flap deflector or tilt apparatus and mechanism totally within the flap profile. Because of the length of the flap in present-day larger aircraft, it is herein proposed to fabricate it in segments which are interconnected to tilt in unison with special provision to permit the spanwise movement of these segments during such tilting.

The extension and tilt drives also are interconnected for gang operation and include special provisions to assure operation without binding due to deflections of the mechanism, flap and wing structures. These special provisions also permit the system to function without binding from the complex three-dimensional secondary flap geometric motions which occur when a tapered flap is installed on a tapered, swept back wing and when the flap must be extended streamwise. When the flap is extended, the supports therefor are such as to align streamwise and offer minimum slot flow drag.

Moreover, the mechanism herein proposed is designed and constructed to provide for independent flap extension and flap tilting, although the two motions may be programmed in sequence, individually or simultaneously. This permits the flap to be controlled as a flaperon, as an extension of wing area without tilt, or as a conventional extensible flap.

More specifically, the present flap actuating mechanism comprises an appropriate system of rails slidably mounted on stationary structure within the wing through self-aligning, substantially universal connectors for relative movement concurrently in both the streamwise and spanwise directions. A flap is mounted on these rails through universal connections and linear drive means is operatively connected between the rails and the fixed wing structure. Angular drive means is operatively connected between the flap and the universal connections. The rail/wing connections, the flap/rail connections, and the linear and angular drives are all housed internally of the wing and flap profiles so as to provide an aerodynamically clean wing during cruise and high speed operation of the aircraft.

With the above and other objects in view as will be apparent, this invention consists in the construction, combination, and arrangement of parts all as hereinafter more fully described, claimed and illustrated in the accompanying drawings wherein:

FIG. 3 is a transverse section taken through the aft portion of the wing as generally illustrated in FIG. 2 to show the combination therewith of a flap actuating mechanism designed and constructed in accordance with the teachings of this invention, the flap being located in the retracted or aircraft cruise position with its deflected position being illustrated in phantom lines;

FIG. 4 is a section similar to FIG. 3 of the extreme aft wing portion together with the flap and actuating mechanism therefor, the flap being located in the fully extended and partially deflected position corresponding to take-off operation of the aircraft, for example, the undeflected position of the flap being illustrated in phantom lines;

FIG. 5 is a section similar to FIG. 4 showing the flap in the fully extended and fully deflected position corresponding to landing operation of the aircraft, for example;

FIG. 6 is a plan elevation of a fragment of the aft section of the wing and associated flap with portions broken away to reveal an underlying extensible and retractable rail and connector elements between the rail and wing structure as well as between the rail and flap;

FIG. 7 is a transverse section taken along line 7—7 of FIG. 3 to show primarily the mounting of the forward end of a rail to the fixed wing structure for simultaneous fore and aft sliding and lateral, spanwise relative movement therewith;

Figure 1:
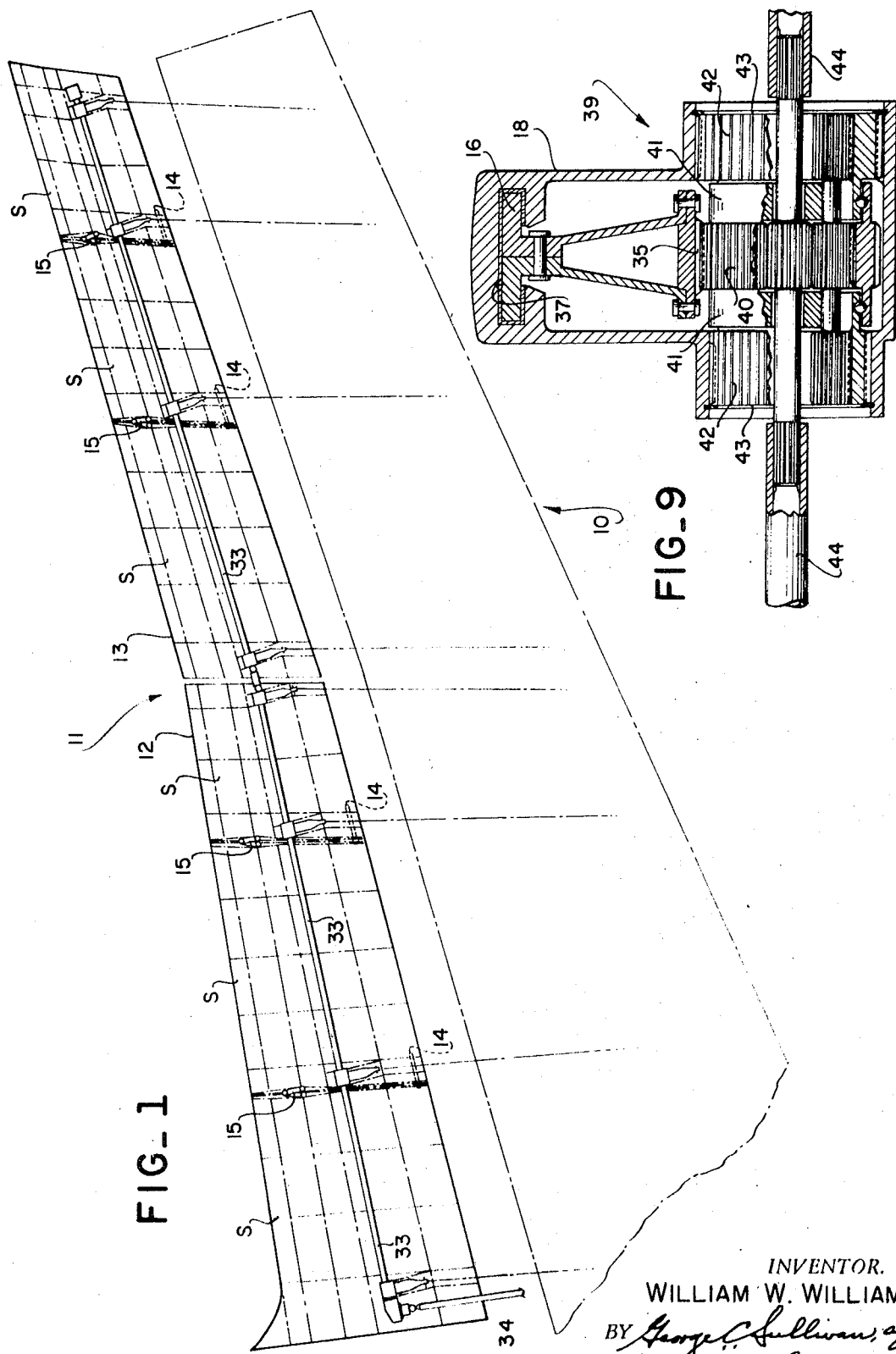
FIG. 1 is a plan elevation of a wing within the contemplation of the present invention and which includes tapered inboard and outboard flap sections, each comprised of three segments to show primarily the interconnection thereof through components of the actuating mechanism herein proposed for the angular deflection thereof in unison.

FIG. 8 is a section taken along line 8—8 of FIG. 6 to show the self-aligning and universal connection of the rail with fixed wing structure whereby the rail is capable of lateral or spanwise movement relative to the wing concurrently with its fore and aft movement therewith; and FIG. 9 is a transverse section taken along line 9—9 of FIG. 6 to show the linear drive means connected between a rail and fixed wing structure.

Referring more particularly to the drawings, 10 designates a fragment of a swept back wing of an aircraft having a flap 11 mounted at and along so as to constitute the trailing edge thereof. This flap 11 is composed of two parts, an inboard section 12 and an outboard section 13, each of which is tapered. Each section 12 and 13 in turn comprises three segments, each of which for all intents and purposes here may be considered identical and designated generally S. Each segment S of both the inboard and outboard flap sections 12 and 13 is interconnected with the next adjacent segment S by means of and through a pin connection 14 adjacent the forward edges thereof and by a pair of interconnecting torque links 15 adjacent the trailing edges thereof. Through such connections 14 and 15 the several flap segments S of each flap section 12 and 13 are interconnected for angular deflection in unison; at the same time, bending loads are not permitted to cross any of the joints between the segments S.

Each flap segment S is connected to fixed wing structure by means of an through at least one rail 16. To this end, each such rail 16 is connected for example to the rear wing spar or beam 17 (FIG. 3) through a slidable forward support 18. Each rail 16 is also connected to wing structure by a rail slide bearing 19 carrying a spherical or ball lug 20 mounted in a T-block assembly 21 which engages a complemental spanwise T-slot track 22 bolted on otherwise appropriately secured to the trailing edge wing structure (FIG. 8). The contact surfaces of all of the bearings 19, ball lugs 20, T blocks 21 and tracks 22 are coated or lined with a low friction material to facilitate the unrestricted relative movement therebetween. Preferably a dry lubricant is employed such as is commonly available on the market today, for example tetraflouroethylene impregnated fabric.

Each flap segment S in turn is connected to each associated rail 16 by means of and through a hinge fitting 23 carried by and depending from the rail 16 near the aft end thereof and engageable with a complemental spherical fitting 24 carried by the flap segment S adjacent the forward end thereof. A tilt epicyclic gear assembly 25 on the flap 11 is connected through a tilt link 26 to the aft end of the associated rail 16. The flap tilt link 26 has a self-aligning spherical or ball fitting 27 in each end. One end bolts to a clevis 28 at the aft end of the rail 16, while the other end bolts to the arms 29 on the center ring gear 30 of the flap tilt epicyclic gear assembly 25. The end ring gear 31 of the tilt gear assembly 25 bolts to convenient flap structure, such as the leading edge structural ribs 32 (FIG. 6).

Figure 2:
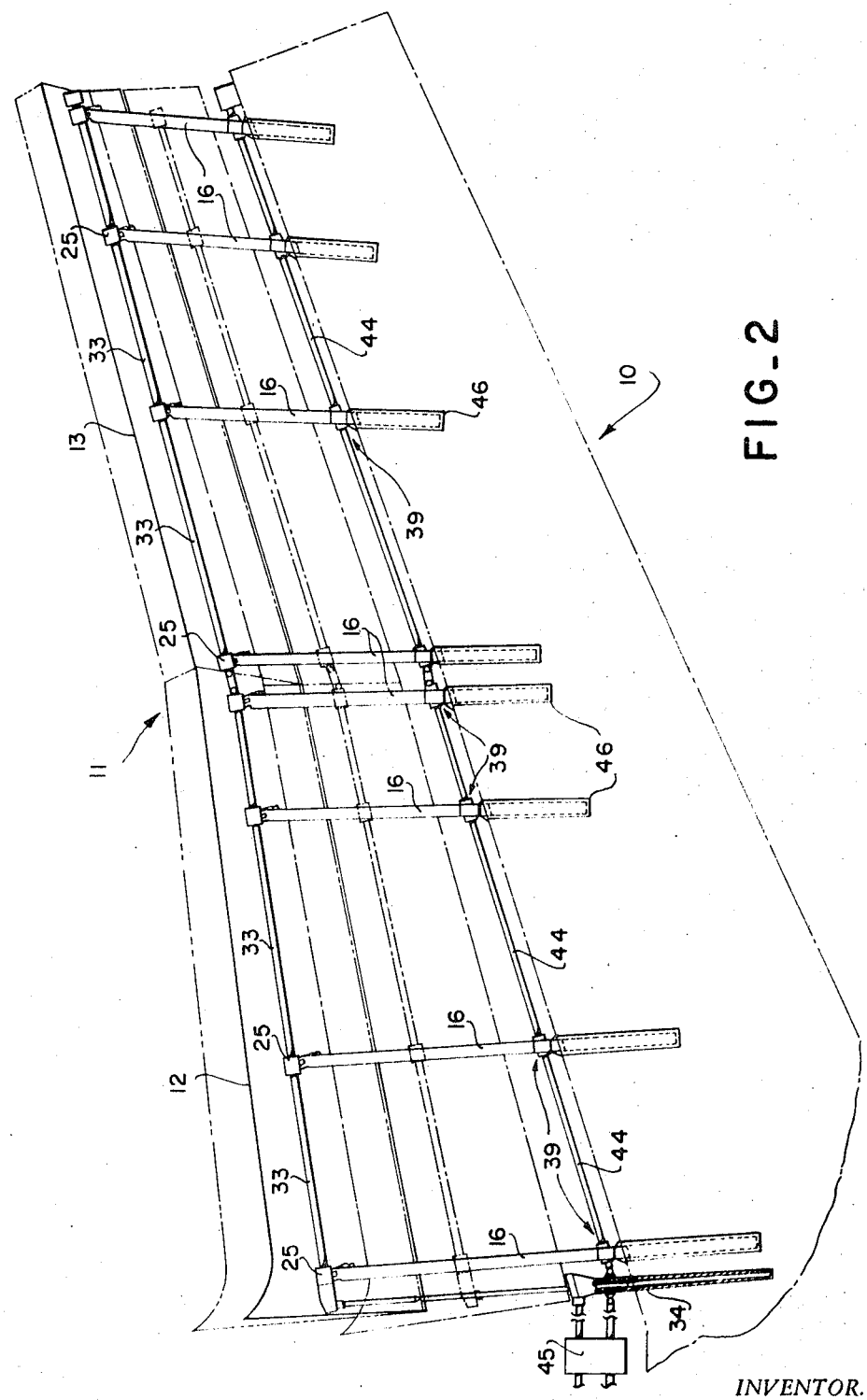
FIG. 2 is a similar view to show primarily the extensible and retractable rails contemplated by the present invention in conjunction with the flap deflecting arrangement illustrated in FIG. 1.

Each tilt gear assembly 25 is driven through a drive shaft 33 by a power unit 45 (FIG. 2) mounted remotely in some convenient place in the aircraft. This power unit 45 drives the several flap tilt gear assemblies 25 through appropriate gear connections and a sliding splined drive shaft assembly 34, which serves to maintain engagement between the drive shaft of the power unit 45 and the flap tilt gears 25 through their shafts 33. In any case, all of the tilt gear assemblies 25 are interconnected for operation in unison.

Each rail 16 is an I-section formed or otherwise provided with gear teeth 35 on its bottom face. The forward rail support 18 has two T-slot rail slide bearings 36 which engage the top flange 37 of the I-section rail 16 and is connected to the wing beam by means of and through a spherical or ball attachment fitting 38. This support 18 also carries and houses an epicyclic gear assembly 39 and which is, in effect, a power hinge with external gear teeth 40 on its center ring gear 41 and splines 42 on both its end ring gears 43 (FIG. 9). It is driven through a drive shaft 44 by an appropriate remote power unit which may be the unit 45 with proper internal design to permit its operation as a common drive for the several gears 39 as well as the several flap tilt epicyclic gears 25. When the flap sections S are retracted, the several rails 16 each extend through a hole provided therefor in the rear beam 17 of the wing 10 and may be enclosed in a sealed pocket 46 if the rail 16 is located at a fuel bay in the wing 10.

In view of the foregoing arrangement and construction, extension of the flap sections S is accomplished by sliding the several rails 16 aft in their respective T-slot bearings 36 in the forward rail support 18 and 19 in the T-slot track 22 in the wing trailing edge support. The several rails 16 are thus driven by the flap rail extension drive shaft 44 which rotates the externally toothed center ting gears 41 of the gear assemblies 39 mounted in the forward rail supports 18. The teeth 40 on each ring gear 39 engages the rack gear teeth 35 on the bottom flange of the associated rail 16 thereby moving it aft when the ring gear 39 rotates clockwise (FIG. 3) and forward when the ring gear 39 rotates counterclockwise. Since the flap sections S are attached to the flap hinge fittings 23 on the bottom of the rail 16 and to the clevis 28 on the aft end of rail 16 by means of the tilt link 26 and flap tilt epicyclic gear assembly 25, the several flap sections S are positioned longitudinally, i.e., extended airstreamwise by the rail 16.

The flap tilt angle is controlled by rotating the flap tilt drive shaft 33 which in turn rotates the center ring gear 30 and arms 29 of each flap tilt epicyclic gear assembly 25. The arms 29 of the gear assembly 25 being attached to the clevis 28 at the aft end of the rail 16 by the tilt link 26, rotation of the center ring gear 30 of the tilt gear 25 serves to rotate the associated flap section S about its flap hinge fitting 23. When thus rotated clockwise (FIGS. 3 and 4), the gear assembly moves downward so as to increase the angle of attack of the flap section S. Due to the ball type bearings 27 and 38 used in the ends of the tilt links 26 and forward rail support 18 respectively in conjunction with the ball lug 20 operative in the T-block assembly 21 mounted in T-slot track 22 to slide spanwise, as described, the entire mechanism functions without binding despite the complexity of secondary motions which result from deflections of the mechanism, wing and flap. Such unrestricted functioning is also possible when the mechanism is installed on a highly swept wing in which case the longitudinal motion of the flap section S is generally parallel to a plane vertical to the fuselage centerline, i.e., streamwise. This is equally true where relatively long span, tapered segments are employed.

While shown and described in what is believed to be the most practical and preferred form or embodiment, it is apparent that departures from this specific structure will suggest themselves to those skilled in the art. The illustrated and described embodiments are, therefore, not to be construed as limitations of the invention as covered by the appended claims.

What is claimed is:

1. An actuating mechanism for a flap operative on the trailing edge of a wing of an aircraft comprising:

a plurality of rails slidably mounted on stationary structure within said wing through self-aligning substantially universal connectors for relative movement therewith concurrently in both the streamwise and spanwise directions;

a universal hinge between each said rail proximate the aft end thereof and the forward end of the flap whereby the latter is capable of angular deflection relative to the former;

extensible linkage connecting said flap medially thereof to the aft end of each said rail;

a universal connection between opposite ends of said linkage and said flap and said rail whereby said flap is capable of spanwise movement concurrently with its angular deflection aforesaid; and a power unit operatively connected to all said rails and to all said linkages for the respective operation thereof in unison and rotation of the flap about said hinges.

2. The mechanism of claim 1 wherein said flap is composed of multiple sections each of which in turn is composed of multiple segments interconnected one to the next adjacent their leading edges by a pivot pin and adjacent their trailing edges by a pair of interconnecting torque links and at least one of said rails is connected as aforesaid with each of said segments.

3. The mechanism of claim 2 wherein said power unit is remote from said flap and includes drive shafts to each said rail linkage connection and a sliding connection between said power unit and said rail and linkage drive shafts for the constant interengagement thereof at all times and during all rail movement aforesaid.

4. The mechanism of claim 1 wherein each said rail is mounted on stationary wing structure through a forward slide bearing mounted on a spherical fitting and an aft slid bearing mounted on a spherical lug slidably mounted in a complemental track disposed spanwise of said wing.

5. The mechanism of claim 1 wherein each said rail includes gear teeth along one side thereof in mesh with complemental teeth of a first epicyclic gear mounted on stationary wing structure through a spherical fitting, a second epicyclic gear mounted on stationary flap structure adjacent each said rail and having an arm extending from its center ring for connection with an arm extending from said rail aft end and a drive connecting each said first and second epicyclic gear to said power unit.

6. The mechanism of claim 5 wherein said first and second epicyclic gears and said drive therefor are all mounted internally of the respective wing and flap at all times.

* * * * *